Figure 1:
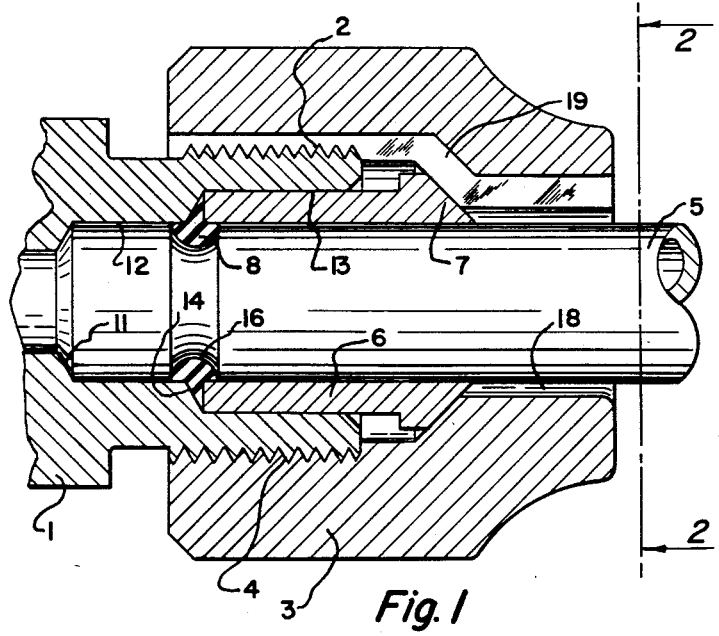

June 28, 1960 R. SMITH 2,942,894
CONDUIT COUPLING HAVING MEANS FOR PREVENTING DAMAGE
TO THE COUPLING DUE TO FREEZING WATER
Filed Sept. 17, 1958

INVENTOR.
Robert Smith
BY
His Attorney

United States Patent Office 2,942,894
Patented June 28, 1960

2,942,894

CONDUIT COUPLING HAVING MEANS FOR PREVENTING DAMAGE TO THE COUPLING DUE TO FREEZING WATER

Robert Smith, Dayton, Ohio, assignor to General Motors Corporation, Detroit, Mich., a corporation of Delaware Filed Sept. 17, 1958, Ser. No. 761,578

1 Claim. (Cl. 285—13)

This invention relates to conduit couplings and particularly to coupling devices subjected to below water freezing temperatures.

While my invention is directed primarily to couplings in conduits of refrigerant circulating or circulatory systems it is to be understood that the presently disclosed coupling is susceptible of inclusion in all fluid transmitting or conveying lines and particularly lines of small bore such as automobile and airplane fuel lines and the like. In refrigerating systems multi-part couplings or coupling devices are employed in conduit lines to circulate a refrigerant medium in the system on the compressor or pump side of a chilling unit or evaporator and at least one such coupling is usually disposed close to or adjacent the unit or evaporator. The changeable temperature conditions to which the coupling is subjected due to periodically defrosting the evaporator and thereafter reducing its temperature well below freezing or the low temperature that exists in the return line to the compressor or pump causes defrost water to flow over the coupling and causes moisture ambient the coupling or outside the conduit to condense on the coupling device. This moisture will enter any exposed parts, cracks or crevices in the coupling device structure and when the temperature in the conduit line or in the vicinity of the evaporator is reduced to a point below water freezing the condensed moisture or water lying in or caught within a crack, niche or crevice of the coupling device structure solidifies or freezes. If the freezing and expanding water in the crack or crevice of the coupling is confined therein the enormous pressure created by the expanding water upon freezing is capable of applying great force to parts of the coupling. This usually results in rigid portions of the coupling bursting apart or in the conduit connected thereto being deformed or collapsed to such a degree that the joint in the coupling becomes damaged or unsealed thus permitting refrigerant to leak at the coupling and escape from the refrigerating system whereby the system is rendered ineffective to produce refrigeration.

An object of my invention is to provide an improved, low cost coupling device for conduits of refrigerating systems which will withstand various conditions of temperature changes in the presence of moisture.

Another object of my invention is to provide in a coupling of a conduit line in a refrigerating system means for preventing moisture which may enter cracks or crevices of the coupling structure or device from being confined therein whereby freezing and expanding water in the cracks or crevices will not burst or damage the coupling or deform and close off a conduit projecting therefrom or break a joint between the conduit and the coupling.

A further object of my invention is to provide means in a coupling device of a conduit line in a refrigerating system to at all times vent each side or end of a crack or crevice in the coupling structure to the exterior thereof for preventing moisture caught or lying in such a crack or crevice from being confined therein whereby the freezing moisture or water upon expanding in the coupling is free to expand in opposite directions outwardly of the coupling and will not therefore damage same or cause a joint therein to leak.

In carrying out the foregoing objects it is a more specific object of my invention to provide a nut member of a coupling device in a fluid conduit circulating system with a relief slot or slots which extend from end to end of the member across an exposed crack or crevice in the coupling so that moisture or water contained in the crack or crevice and freezing therein will not be entrapped or confined and is directed by walls of the slot or slots outwardly of the coupling toward either end of the nut member to relieve a sealed joint in the coupling of the expansive force of the freezing water for preventing deformation of the conduit in the vicinity of the joint to eliminate possibility of the sealed jont being fractured.

Further objects and advantages of the present invention will be apparent from the following description, reference being had to the accompanying drawing, wherein a preferred form of the present invention is clearly shown.

Figure 2:
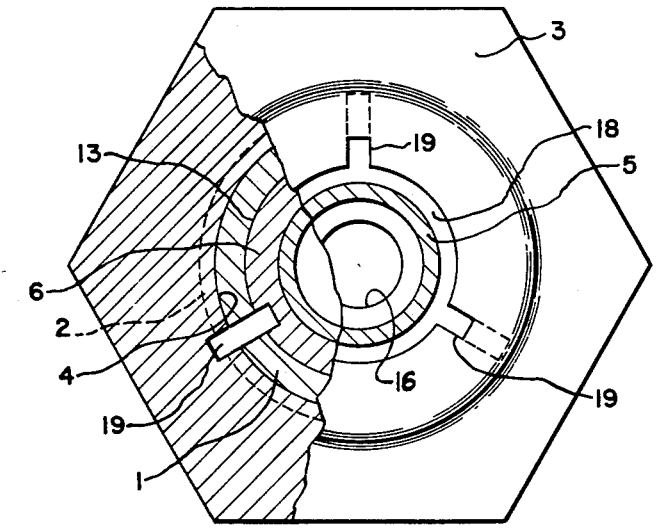

In the drawing:

Figure 1 is a vertical longitudinal section of the improved coupling showing my innovation incorporated therein; and Figure 2 is an end view of the coupling taken on the line 2—2 of Figure 1 fragmentarily broken away to show the fit of parts thereof with one another.

It is my intention to provide a multi-part coupling in a refrigerant conduit conveying system which while being exposed to moisture and subjected to below water freezing temperature is substantially frost-proof to thus eliminate the necessity of providing an additional sealing housing or flexible protective cover thereover whereby the coupling can be formed of a minimum of parts and will withstand, over an indefinite period of time, temperature changes ranging above and below water freezing temperatures. Referring now to the drawing I show in Figure 1 thereof a coupling or coupling device comprising a chambered male or body member 1, externally threaded as at 2, and a female nut member or another hollow tubular body member 3, internally threaded as at 4, having an end portion thereof surrounding a conduit, pipe or tube 5. Preferably the body members 1 and 3 are machined from brass forgings and conduit 5 may be a ferrous, copper or non-ferrous tube. The coupling is for use in a small bore conduit fluid circulating system and its illustration in the drawing is enlarged being on substantially a four to one scale. The coupling also comrpises a brass or the like sleeve 6 provided with a tapered shouldered end 7 adapted to be engaged by a tapered shoulder in nut member 3, adjacent the portion thereof embracing conduit 5, and a resilient or compressible rubber-like sealing gasket or O-ring 8. Male or body member 1 is adapted to be attached to or connected with, in any suitable or conventional manner, another conduit or a chilling unit or evaporator (not shown) of a closed refrigerating system from which refrigerant is conducted and conveyed or returned thereto. In making or assembling the coupling connection of conduit 5 with male member 2 female nut member 3, sleeve 6 and O-ring 8 are slipped in that order over conduit 5 so as to surround same and the open end of this conduit is then inserted in male member 1 against a shoulder 11 provided in a bore 12 therein. O-ring 8 and sleeve 6 are forced along conduit 5, while holding the end of the conduit against shoulder 11, into an enlarged bore 13 in male body or member 1 whereupon O-ring 8 engages a shoulder 14 intermediate the bores 12 and 13. Female nut member 3 is thereafter brought into engagement with the shoulder 7 on sleeve 6 and the threads 4 in member 3 threaded upon the threads 2 of male member 1. Nut member 3 is tightly threaded upon male member 1 whereby the tightening pressure causes sleeve 6 to compress O-ring 8 against shoulder 14 whereupon the ring expands inwardly against conduit 5 and deforms a portion of the copper conduit spaced from its end, as at 16, so as to provide an interlocking fluid tight joint or seal between the conduit and male member 1 inwardly of the tapered end 7 of sleeve 6. While I have shown a preferred fluid tight seal or joint between a portion of conduit 5 and male body member 1 in the present coupling device such a joint may, insofar as my invention is concerned, be formed or provided in any suitable or conventional manner. It is to be here understood that the outer diameter of sleeve 6 is substantially the same as the inner diameter of bore 13 in member 1 so as to be press-fitted thereinto and that the inner diameter of sleeve 6 is substantially the same as the outer diameter of conduit 5 so as to tightly or frictionally engage the conduit. Thus sleeve 6 frictionally surrounds or fits over conduit 5 and is sealingly pressed into the bore 13 of male member 1 in the vicinity of the joint between male member 1 and the conduit to water seal the joint and space same from a portion of nut member 3 embracing conduit 5. That portion of female nut member 3 embracing conduit 5 loosely fits over the conduit, to permit rotation of this member, and consequently forms a clearance space, crack or crevice indicated at 18 intermediate a portion of female nut member 3 and a portion of conduit 5.

It is well known to those skilled in the art that such clearance space, fissure, crack or crevice 18 which extends or leads inwardly of a coupling structure creates a problem and is a source of trouble particularly in a coupling device subjected to or alternately maintained below 32° F. and above freezing. For example the coupling when subjected to or maintained at a below water freezing temperature causes moisture in air ambient to the coupling to condense interiorly of the coupling within the exposed space, crack or crevice 18. The moisture of water lying in or caught within this crevice 18 is freezable therein and is detrimental to the sealed joint of conduit 5 with member 1. Moisture or water within a deadended clearance space, cavity or crack such as or similar to crevice 18 at times first freezes along or adjacent to its open side or end whereby the remainder of the water is trapped in the crevice and blocked from expanding outwardly of the coupling. This trapped water upon thereafter freezing and expanding in the crevice creates a tremendous force internally of the coupling which is applied to parts thereof and may burst nut member 3 apart. If the nut member does not burst apart or become damaged under this condition the freezing and expanding water within crevice 18 will mash or deform conduit 5 and its deformation in addition to blocking or restricting flow of refrigerant through the conduit also presents another or greater hazard. Successive thawing and freezing of water in clearance space or crevice 18 continues or further mashes or deforms conduit 5 thus increasing the size, length and water holding capacity of the crevice progressively in a direction toward the sealed or fluid-tight joint in the coupling. In absence of some protective means for the coupling to relieve, check or prevent deformation or mashing of conduit 5 in the direction of the sealed joint therein deformation of the conduit will eventually reach this joint and cause it to break or be fractured whereby all the refrigerant in a closed refrigerating system may escape therefrom.

In accordance with my invention and innovation I prevent deformation of a conduit in the vicinity of a coupling in a fluid circulating conduit system and thereby eliminate the hazard above described particularly without necessitating the employment of other or additional elements or parts in a conduit coupling device. To this end I provide in the interior surface of female nut member 3 a plurality of slots 19, three equally spaced apart slots (see Figure 2), extending from end to end of member 3 along or in traversing communicating relation to clearance space or crevice 18 in the coupling and along or across the threaded connection between members 1 and 3 thereof the function or purpose of which will now be described. My coupling device is such that if moisture condenses in the clearance space or crevice 18 while refrigeration is in process or water collects or accumulates therein during defrosting of the evaporator of the refrigerating system and its temperature thereafter again reduced below 32° F. the water will freeze and expand therein. Should the water first freeze at the unrestricted or open end of crevice 18 and close same to trap or confine the rest of the expanding body of water inwardly of said end of the crevice the continuous passage afforded by slots 19 permits the body of water to expand therethrough toward the end of female nut member 3 opposite the open end of crevice 18. In other words the walls of slot 19 serve to direct freezing and expanding water in the crevice 18 within the coupling outwardly thereof in either of two directions for relieving conduit 5 of the expansive force of the freezing water whereby to prevent deformation thereof and/or bursting of parts of the coupling. Freezing and expanding water within the clearance space or crevice 18 of the coupling cannot be confined or entrapped therein and will not therefore deform conduit 5, nor burst the female nut member 3 nor fracture the joint 16. By virtue of extending the slots 19 entirely through nut member 3 water within the coupling and contained in the clearance space or crevice 18 or in any one of the slots 19 upon being frozen is free to expand and continue its expansion in either of two directions toward an end of female nut member 3 outwardly of the coupling. Thus I have provided an improved coupling structure which is substantially frost-proof and will withstand alternate freezing and thawing periods of moisture or water within a portion thereof without deforming a conduit therein or damaging the coupling construction and which construction requires no protective sheath or covering. By my invention I utilize an alteration or modification in the character or physical structure of an element already present in a coupling device to thereby render a conduit coupling frost-proof to thereby minimize manufacturing costs of the coupling device. Since my coupling is of such novel construction as to be of the so-called frost-proof type it may be employed in places where moisture is prevalent and water flows into contact therewith specifically where the temperature within the coupling or in air ambient thereto ranges below and above 32° F. with assurance of undamage thereto by conditions typically existing in refrigerating systems.

While the form of embodiment of the invention as herein disclosed constitutes a preferred form, it is to be understood that other forms might be adopted, as may come within the scope of the claim which follows.

What is claimed is as follows:

A coupling device for use in a fluid circulating system wherein the device is alternately subjected to temperatures above and below 32° F. and has a crevice exposed to moisture ambient thereto which is enterable therein and flowable inwardly of the coupling device, said device comprising a body member, a nut member having a first inner diametered portion surrounding a conduit projecting therefrom with the crevice located therebetween, a second inner diametered portion enlarged relative to said first portion thereof connected to said body member by being threaded thereto and an integral tapered third portion intermediate said first and said second portions sealingly clamping an end part of said conduit to said body member to form a fluid tight joint of the conduit therewith, said nut member being provided with at least three substantially equal spaced-apart slots in its inner surface extending continuously therethrough across said three portions thereof in parallel relation to the axis of said conduit and communicating with said crevice and said enlarged threaded portion of the nut member, said slots having a radial dimension greater than the depth of the threads on said second portion of the nut member and having outlets at each end thereof opening to the exterior of said coupling device, the communication of said slots with said crevice draining water collecting therein therefrom irrespective of the disposition of said coupling device and while same is at a temperature above 32° F., and water failing to drain from and being entrapped in said crevice, when the temperature of the coupling device is reduced below 32° F., freezing therein and expanding into said slots with walls of the slots directing the expanding water and ice in two directions therealong toward the opposite outlets thereof whereby to relieve said conduit in the vicinity of said crevice of the expansive force created thereby for preventing deformation of the conduit and fracture of said joint.

References Cited in the file of this patent

UNITED STATES PATENTS

| | | |
|---|---|---|
| 907,187 | Sheckler | Dec. 22, 1908 |
| 2,082,164 | Karrer | June 1, 1937 |
| 2,109,344 | Selger | Feb. 22, 1938 |
| 2,499,024 | Hollyday | Feb. 28, 1950 |
| 2,542,877 | Newcum | Feb. 20, 1951 |
| 2,688,500 | Scott | Sept. 7, 1954 |

FOREIGN PATENTS

| | | |
|---|---|---|
| 59,651 | France | Feb. 3, 1954 |